Patented Aug. 1, 1939

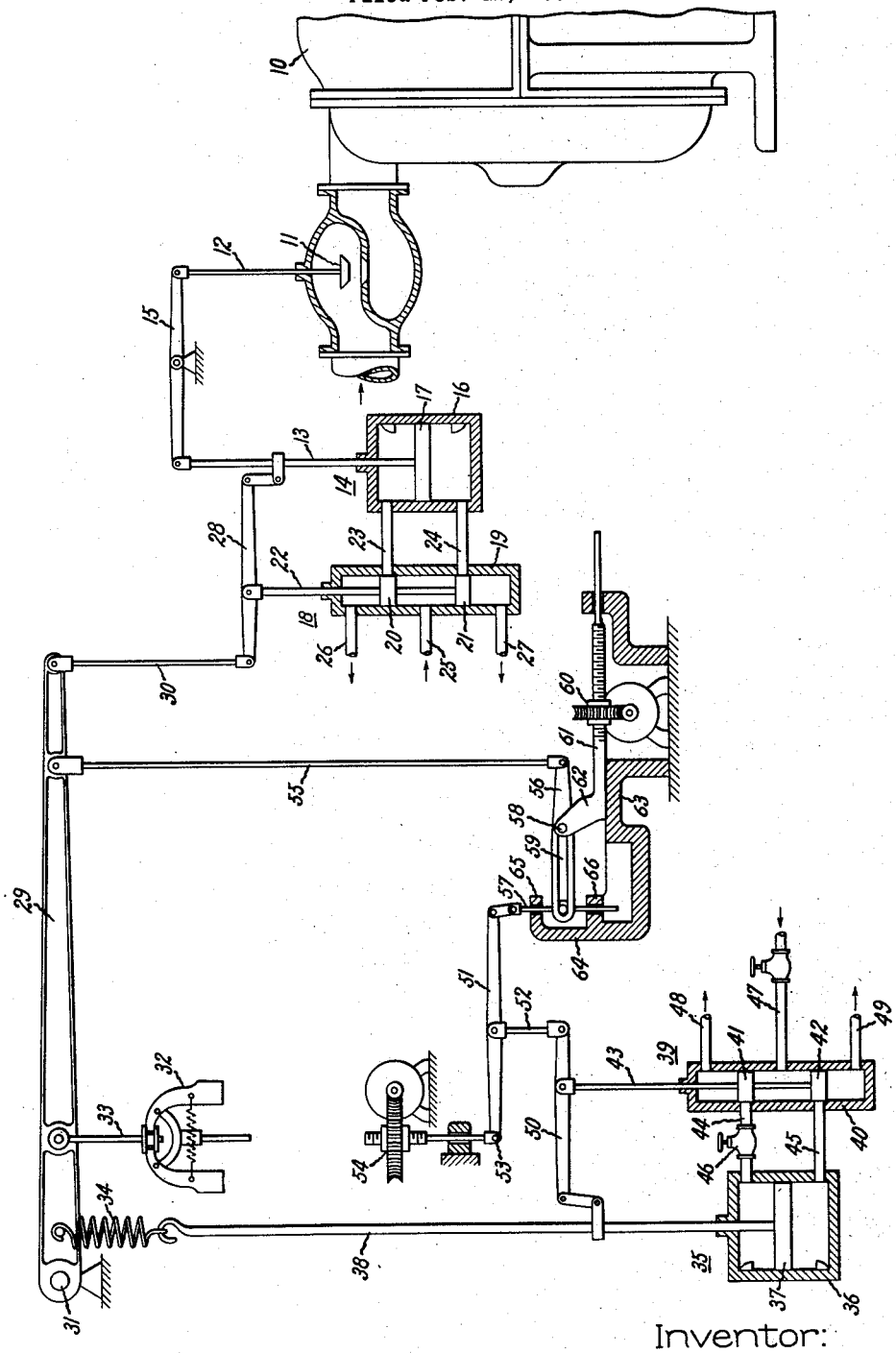

2,168,155

UNITED STATES PATENT OFFICE 2,168,155

GOVERNING SYSTEM FOR ELASTIC FLUID ENGINES

Reed J. Caughey, Schenectady, N. Y., assignor to General Electric Company, a corporation of New York Application February 12, 1938, Serial No. 190,252

6 Claims. (Cl. 264—4)

The present invention relates to governing mechanisms for regulating a control valve or valves for elastic fluid engines in response to speed changes. More specifically, the invention relates to governing mechanisms which include speed correcting means of the type disclosed in the patents to Standerwick 1,629,318 and Dickinson 1,976,659 and assigned to the General Electric Company.

In speed governor systems for maintaining a constant speed of the prime mover during variable load conditions, a valve controlling the supply of elastic fluid to a turbine is usually directly connected with the speed responsive governor. In this arrangement each change in position of the supply valve is accompanied by a corresponding change in position of the governor which must be adjusted for each load change to maintain its equilibrium speed constant.

It is an object of this invention to provide an improved construction and arrangement of the type of governing mechanism referred to above whereby the governor is automatically adjusted for constant speed equilibrium following variations in the load on the prime mover.

For a consideration of what I believe to be novel and my invention, attention is directed to the following specification and the claims appended thereto in connection with the drawing which forms a part of the specification.

The single figure of the drawing shows a governing mechanism embodying my invention in connection with an elastic fluid turbine, the speed of which is held constant through variable conditions of load.

Referring to the drawing, 10 indicates an elastic fluid turbine having a control valve 11 for controlling the admission of elastic fluid thereto. This valve has a stem 12 connected to the stem 13 of a hydraulic motor 14 by means of a fulcrumed lever 15. The hydraulic motor 14 comprises a cylinder 16 having a piston 17 movably arranged therein and fastened to the end of stem 13. Control means for the motor is shown in the present instance as an ordinary pilot valve 18 comprising a casing 19 and valve heads 20 and 21 fastened to a stem 22. The pilot valve communicates with the upper and lower chambers of the motor by conduits 23 and 24 respectively and is provided with a supply connection 25 and drain connections 26 and 27. The stem 22 of the pilot valve is connected to a lever 28, the right end of which is connected to the stem 13 and the left end of which is connected to the governor beam 29 by means of a link 30. The beam is pivoted at 31 and is controlled by a speed governor 32 which is connected to the beam by a link 33. Speed governor 32 may be driven from the turbine in any suitable manner.

The mechanism so far described is typical of any hydraulic regulating arrangement in which the speed governor serves for controlling a relay or pilot valve which in turn causes operation of a motor having a member for moving a valve to be regulated. The operation of this mechanism is as follows:

Assuming the pilot valve is in its balanced position where the valve heads 20 and 21 register with the ports of conduits 23 and 24, the valve 11 is retained in a predetermined position since passage of fluid from either side of the piston 17 of the motor 15 is precluded. If now the speed governor changes its position, for instance, due to an increase in speed causing an outward movement of the flyweights, the fulcrum lever 29 will be moved in a clockwise direction and by means of link 30, the lever 28 will be pivoted about the right hand end and cause a downward movement of the pilot valve heads. The head 21 thereby uncovers the port of conduit 24 allowing oil under pressure from the conduit 25 to flow through the casing 19 into the lower chamber of the cylinder 16 which tends to force the piston 17 upwardly and move the valve 11 toward a closed position. Simultaneously the valve head 20 will uncover the port of conduit 23 allowing fluid to drain from the upper chamber of the cylinder 17 through the drain 26. As the stem 13 of the motor moves upwardly, the right hand end of lever 28 is rotated counterclockwise pivoting it about the left hand end carrying the pilot valve stem 22 upwardly and restoring the valve heads to their normal position.

If an actuation of the pilot valve in the opposite direction takes place, owing to a decrease in speed, valve head 20 moves upwardly and permits actuating fluid to be supplied through the conduit 23 to the upper chamber of cylinder 16. Simultaneously fluid from the opposite side of the piston 17 is drained through the conduit 24 and discharge conduit 27. This causes a downward movement of the piston whereby the valve 11 is moved away from its seat toward the opened position increasing the supply of elastic fluid to the turbine 10.

Where the turbine is coupled to a load which must be driven at a constant speed such as a generator connected to a network, the load thereon is subject to fluctuations and the supply of fluid to the turbine must be regulated so as to maintain constant speed of the engine. It is seen, however, that for each position of the valve 11, the beam 29 has a certain definite position. Also for each speed of the engine and with a constant force acting against the governor, the flyweights thereof assume a predetermined definite position. Thus, as is well understood in the art, the speed governor must be corrected for each change in the position of the valve 11, which is usually accomplished by varying the force acting against the flyweights of the governor. Auxiliary loading or compensating means are usually provided which act upon the fulcrum lever 29 in varying amounts in the same direction as the speed governor. The adjustment of such compensating means is usually effected manually by an operator observing the changing load conditions.

According to the present invention I have provided means for automatically effecting compensation of the speed governor in a simple and reliable manner. In the present instance, I have shown loading means in the form of a compensating spring 34 secured to the governor beam 29, the tension thereof being variably adjustable by means of the hydraulic motor 35. In this instance I have shown the motor as comprising a cylinder 36 having a piston 37 suitably arranged therein and attached to the lower end of a stem 38 which is connected at its upper end with the end of the spring 34. The motor 35 is controlled by means of a pilot valve 39 comprising a casing 40 having valve heads 41 and 42 suitably arranged upon a stem 43 therein. The casing 40 is in communication with the upper and lower chambers of the motor 35 through connecting conduits 44 and 45, respectively, a needle valve 46 being provided in the upper conduit 44 for the purpose of controlling the rate of flow of actuating fluid to and from the upper chamber of the motor. Actuating fluid is supplied to the pilot valve casing through conduit 47 and is drained therefrom by means of conduits 48 and 49. The pilot valve is controlled by the floating lever 50, the left end of which is connected to the motor stem 38 and the right end to a fulcrum lever 51 by means of a link 52. The left end of lever 51 is supported by a pivot 53 which is adjustable by means of suitable gearing 54. The right hand end of lever 51 is actuated in accordance with the movement of the governor beam 29 by means of the connecting link 55, the fulcrumed lever 56 and connecting link 57. The fulcrumed lever 56 is supported upon an adjustable pivot 58 which is adapted to be moved in the elongate slot 59 provided in the lever 56. Adjustment of the pivot 58 is made by means of suitable gearing 60 provided on an extension 61 of the pivot bracket 62. The pivot bracket 62 is slidably mounted in a frame 63 which has an extension 64 providing suitable guides 65 and 66 for the connecting link 57 engaged by the left end of the lever 56.

The operation of the automatic speed compensating means will now be described. Assuming a decrease in the load connected to the turbine 10, the speed thereof will tend to increase causing the flyweights of the speed governor to move outwardly. This movement of the speed governor will cause the beam 29 to turn in a clockwise direction and, as described above, move the valve 11 toward a closed position so that only a sufficient quantity of elastic fluid will be passed thereby as is required for maintaining the new load of the engine at the predetermined constant speed. For this setting of the valve 11, the beam 29 must remain in a position lower than that originally held. Accordingly, the governor is corrected for the new position of the beam so that the flyweights will be rotated in equilibrium but in a position more outward than previous to the change in load. The downward movement of the beam and link 55 causes a clockwise rotation of the fulcrumed lever 56 which in turn causes a counterclockwise rotation of the levers 51 and 50 and an upward movement of the stem 43 of the pilot valve. Valve head 41 then uncovers the port of the connection conduit 44 permitting actuating fluid to be supplied from the conduit 47 into the upper chamber of the cylinder 36. The needle valve 46 in the connection 44 is adjusted to regulate the rate of flow of fluid into the cylinder of the motor and hence the speed of response of the motor 35. Simultaneously, valve head 42 will uncover the port of the connection 45 which will permit fluid to be drained from the lower chamber of the cylinder 36 and discharge through the conduit 49. The ensuing gradual downward movement of the piston 37 will increase the tension in the spring 34 acting upon the beam 29 and add to the force acting upon the governor thus correcting it for the new position which it will assume to regulate the valve 11 for the new condition of load. The pilot valve is restored to its normal position upon downward movement of the stem 38 which will pivot the lever 50 in a counterclockwise direction about the right end thereof to move the stem 43 and valve heads 41 and 42 downwardly to close the ports of conduits 44 and 45.

Should the load on the turbine 10 be increased requiring the supply regulating valve 11 to be adjusted to a wider open position, the beam 29 will be rotated in a counterclockwise direction by the action of the speed governor 32. The speed governor will again be corrected for the new condition by a reverse operation of the apparatus described above which will be actuated to lessen the tension on the compensating spring 34.

For controlling the degree of correction, the pivot 58 is made adjustable by means of gearing 60 so that the effective lever arm moving the link 57 may be varied. If the pivot 58 were moved to the extreme left end of the slot 59, no movement at all would be transmitted from the beam 29 to the pilot valve stem 43 since the lever 56 would be merely rotated about the left end without transmitting any movement to the link 57. Thus by properly adjusting the position of the pivot 58 in the slot 59, the degree of movement of link 57 and pilot valve stem 43 relative to a movement of the beam 29, and the amount of correction for the governor can be regulated as desired from zero to maximum.

By means of the adjustable pivot 53 at the left end of lever 51, which is controlled by gearing 54, the pilot valve 39 may be adjusted manually for any speed position.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent in the United States is:

1. In combination with a prime mover having a valve means for controlling the supply of actuating substance thereto, a motor for moving the valve means, control means for the motor, a speed governor driven by the prime mover for actuating the control means, a second motor operatively connected to said speed governor for correcting said speed governor for load changes, control means for said second motor, means including a lever pivoted intermediate its ends connecting said last mentioned control means with said speed governor, said intermediate pivot being slidably arranged for adjusting the degree of actuation of said last mentioned control means by said speed governor.

2. In combination with a prime mover having a valve means for controlling the supply of an actuating substance thereto, a motor for controlling said valve means, control means for said motor, a speed governor driven by said prime mover for actuating said control means, a second motor operatively connected to said governor for correcting said governor for load changes, control means for said second motor regulated in response to variations in speed of said governor; said control means for said second motor including a lever supported intermediate its ends on a movable pivot for variably adjusting the degree of correction of said governor.

3. In combination with a prime mover having a valve means for controlling the supply of an actuating substance thereto, a motor for controlling the valve means, control means for said motor, a speed governor driven by said prime mover for actuating the control means, a second motor operatively connected to said governor for correcting said governor for load changes, control means for said second motor regulated in response to changes in speed of said governor, said control means for said second motor including a lever having a variable fulcrum, said fulcrum being normally stationary and adjustable for determining the degree of correction applied to said governor.

4. In combination with a prime mover having a valve means for controlling the supply of an actuating substance thereto, a motor for moving the valve means, control means for said motor, a speed governor driven by the prime mover, a governor beam connected to said speed governor for actuating said control means, resilient loading means secured to said governor beam for correcting said governor for load changes, a second motor for adjusting said loading means, a pilot valve for controlling said second motor, means connecting said pilot valve for actuation by said governor beam, said last mentioned means including a lever having a normally stationary slidably arranged supporting fulcrum, and additional means for shifting said fulcrum with respect to said lever.

5. In combination with a prime mover having a valve means for controlling the supply of actuating substance thereto, a speed governor driven by said prime mover for controlling said valve means, resilient loading means operatively connected to said governor for correcting said governor for load changes, motor means for adjusting said loading means, means including a pivoted lever operable by said governor for controlling said motor means, said lever being longitudinally slotted for cooperatively receiving a slidably arranged supporting fulcrum, and means for adjusting said fulcrum for regulating said loading means.

6. In combination with a prime mover having a valve means for controlling the supply of actuating substance thereto, a speed governor driven by said prime mover for controlling said valve means, resilient loading means operatively connected to said governor for correcting said governor for load changes, motor means for adjusting said loading means, means including a pivoted lever operable by said governor for controlling said motor means, an adjustable pivotal support for said lever, and gearing for moving said support longitudinally with respect to said lever.

REED J. CAUGHEY.